United States Patent [19]

Ohlinger et al.

[11] Patent Number: 4,670,177

[45] Date of Patent: Jun. 2, 1987

[54] PREPARATION OF FERROMAGNETIC CHROMIUM DIOXIDE

[75] Inventors: Manfred Ohlinger, Frankenthal; Norbert Mueller, Friedelsheim; Peter Rudolf, Neuhofen; Eugen Wettstein, Germersheim, all of Fed. Rep. of Germany

[73] Assignee: BASF Aktiengesellschaft, Fed. Rep. of Germany

[21] Appl. No.: 763,318

[22] Filed: Aug. 7, 1985

[51] Int. Cl.$^4$ ............................................ C01G 37/027
[52] U.S. Cl. .............................. 252/62.55; 252/62.51; 252/62.56
[58] Field of Search ................ 752/62.51, 62.56, 62.55

[56] References Cited

U.S. PATENT DOCUMENTS

| | | |
|---|---|---|
| 3,034,988 | 5/1962 | Ingraham et al. ................. 252/62.5 |
| 3,278,263 | 10/1966 | Cox ............................... 252/62.51 X |
| 3,449,073 | 6/1969 | Balthis, Jr. et al. ................... 23/145 |
| 3,687,851 | 8/1972 | Hartmann et al. ............... 252/62.51 |
| 3,778,373 | 12/1973 | Robbins ....................... 252/62.51 X |
| 4,340,494 | 7/1982 | Ohlinger et al. ................ 252/62.51 |
| 4,524,008 | 6/1985 | Chen ............................. 252/62.51 X |

Primary Examiner—Jack Cooper
Attorney, Agent, or Firm—Keil & Weinkauf

[57] ABSTRACT

Ferromagnetic chromium dioxide is prepared by converting oxides of trivalent and hexavalent chromium under superatmospheric pressure and at elevated temperatures in the presence of water and with the addition of an antimony compound as a modifier and, if required, further additives in an amount of not more than 15% by weight, by a method in which the antimony compound is present in the form of a water-soluble salt whose anion contains one or more organic molecular moieties which are oxidized in concentrated chromic acid.

8 Claims, No Drawings

PREPARATION OF FERROMAGNETIC CHROMIUM DIOXIDE

The present invention relates to a process for the preparation of chromium dioxide which as a high coercive force and is modified with foreign elements.

A number of processes are known in which ferromagnetic chromium dioxide is prepared starting from a chromium oxide or mixture of chromium oxides having a mean valency of not less than 4, the process being carried out under superatmospheric pressure and at elevated temperatures in the presence of water. Moreover, it is stated in a number of publications that the magnetic properties of the end product can be improved by modifying such a chromium dioxide with a number of metals. For example, U.S. Pat No. 3,034,988 describes the preparation of an improved chromium dioxide by converting chromium trioxide in the presence of a metal of atomic number 22 to 28, or of a compound of this metal, and an element of group V of the periodic table and, if required, water, at from 300° to 500° C. under a pressure of up to 2940 bar. The chromium dioxides prepared in this manner have coercive forces of 34 kA/m at best. In another process as disclosed in Nl-A No. 66 17 476, chromium oxides or mixtures of these in which the chromium has a mean valency of not less than 4 are treated in the presence of alkali metal dichromates and known dopants at from 350° to 500° C. and under from 245 to 980 bar. However, the resulting product possesses a high coercive force only when the reaction pressure is 980 bar. Moreover, a disadvantage of this process is that the starting material required is a chromium (III) oxide which is expensive to prepare.

Furthermore, DE-C No. 20 22 820 discloses that a chromium dioxide having a high coercive force can be obtained if the conventional process is carried out not only with the addition of antimony, selenium, tellurium or compounds of these as a first modifier, but also with the addition of iron in the form of acicular crystals and/or acicular iron oxide particles as a second modifier. The amount of iron used is from 0.1 to 10% by weight, and the total amount of modifier is as high as 25% by weight.

Although these and other similar conventional processes permit preparation of ferromagnetic chromium dioxides having a high coercive force, large amounts of modifiers are generally required. Although these large amounts of added materials do not have an adverse effect on the magnetic properties, they result in a crystallite size which has a marked disadvantageous effect on the electroacoustic properties, particularly where chromium dioxides are used in the preparation of magnetic recording media.

According to EP-A No. 27 640, a further improvement can be achieved by using the cubic modification of antimony oxide, senarmontite. The magnetic properties are improved in a particularly effective manner when the specific surface area of the senarmontite is from 3 to 10 m$^2$/g. However, when the process is carried out it is found that it is difficult to obtain pure senarmontite having this surface area. Another disadvantage is that, on comminuting and milling the senarmontite to give the fine powder required for the synthesis of chromium dioxide, some of the senarmontite is converted to the less effective orthorhombic modification. In addition, special safety measures are necessary for handling antimony oxide in dust form.

It is an object of the present invention to provide a process for the preparation of ferromagnetic chromium dioxides having a high coercive force while at the same time reducing the amount of modifiers required for this purpose. It is a particular object of the present invention to provide a modifier which can be introduced into the reaction system of the chromium dioxide synthesis in very homogeneous and extremely finely divided form, and is also easy to handle.

We have found that this object is achieved, and that, surprisingly, a ferromagnetic chromium dioxide can be prepared by converting oxides of trivalent and hexavalent chromium under superatmospheric pressure and at elevated temperatures in the presence of water and with the addition of one or more antimony compounds as modifiers and, if required, further additives in an amount of not more than 15% by weight, if the antimony compound used as a modifier is present in the form of a water-soluble salt and is added in an amount of less than 4% by weight, based on the resulting chromium dioxide, with the proviso that the anion of the salt-like antimony compound contains one or more organic molecular moieties which are oxidized in concentrated chromic acid.

For the purposes of the present invention, particularly suitable salt-like antimony compounds are antimony tartrate and potassium antimonyl tartrate, as small an amount as less than 2% by weight, based on the resulting chromium dioxide generally being sufficient. Appropriate amounts of from 0.1 to 1.0% by weight of the antimony compound result in an end product having particularly advantageous properties.

In an advantageous embodiment of the process according to the invention, iron, either in the form of acicular iron particles having a BET specific surface area of from 5 to 40 m$^2$/g or, particularly advantageously, in the form of acicular iron oxide particles, such as α- or γ-iron oxide hydroxides, magnetite or α- or γ-iron-(III) oxides, are used as a further modifier, in addition to the antimony compound employed as a modifier. The added amounts are from 0.4 to 10% by weight for the acicular iron particles, or from 0.5 to 15% by weight for the acicular iron oxide particles.

The invention is based on conventional processes for the preparation of ferromagnetic chromium dioxide under superatmospheric pressure and at elevated temperatures in the presence of water. For example, in the present process water is initially taken in a reaction vessel, chromic acid is introduced while stirring, and the modifiers according to the novel embodiment of this process are added. When the evolution of gas, which takes place after the addition, has ceased, chromium (III) oxide is then added, with further stirring, in the stoichiometric amount required for the synproportionation reaction. Formation of the chromium dioxide occurs during the subsequent treatment of the mixture in a high pressure reactor under from 100 to 700 bar at from 200° to 600° C. After from 10 to 50 hours, the chromium dioxide is removed mechanically from the reaction vessel and, if necessary, its surface is stabilized chemically in a conventional manner by the action of a reducing agent. The chromium dioxide thus prepared consists of acicular particles having a mean particle length of from 0.1 to 2.0 μm, in particular from 0.2 to 0.9 μm, a length/width ratio of from 15:1 to 5:1, and a BET specific surface area of from 10 to 50 m$^2$/g.

Surprisingly, the modification according to the invention gives a chromium dioxide having a coercive force greater than 35 kA/m, in spite of the small amount of added antimony compound, ie. less than 4.0, preferably from 0.1 to 1.0% by weight, and a total amount of modifier of less than 15, in particular from 0.4 to 10% by weight, based in each case on the end product. Moreover, the fact that the chromium dioxides obtained by the novel method are more finely divided, and the particularly advantageous narrow particle size distribution, are noteworthy.

The advantageous properties of a chromium dioxide prepared according to the invention are particularly evident when it is used as magnetic material for the preparation of magnetic recording media.

Chromium dioxide prepared in this manner is processed by a conventional method. To produce the magnetic layer, from 2 to 5 parts by weight of chromium dioxide, one part of the binder or binder mixture and suitable dispersants, lubricants and other conventional additives in a total amount of not more than 10% by weight, based on the chromium dioxide, are converted to a dispersion. The dispersion thus obtained is filtered, and applied with a conventional coating apparatus, eg. a knife coater, onto the non-magnetic base in one or more thin layers, or in a thin layer on a magnetic recording medium already provided with another magnetic layer. Before the liquid coating mixture is dried at from 50° to 90° C., the chromium dioxide particles may be oriented magnetically if required. Special surface treatment of the magnetic layer is carried out by passing the coated webs between heated polished rollers under pressure. The thickness of the magnetic layers is then usually from 1.5 to 12 μm.

Suitable binders for the magnetic layers are the conventional polymer binders, such as vinyl chloride copolymers, acrylate copolymers, polyvinylacetals, such as polyvinylformal or polyvinylbutyral, fairly high molecular weight epoxy resins, polyurethanes and mixtures of these and similar binders. Substances which have proven advantageous are the elastomeric, virtually isocyanatefree linear polyester urethanes which are soluble in a volatile organic solvent, as can be prepared by reacting a polyester of an aliphatic dicarboxylic acid of 4 to 6 carbon atoms, such as adipic acid, and one or more aliphatic diols of 3 to 10 carbon atoms, such as 1,2- or 1,3-propylene glycol, butane-1,4-diol, diethylene glycol, neopentylglycol or octane-1,8-diol, with a diisocyanate of 6 to 24, in particular 8 to 20, carbon atoms, such as toluylene diisocyanate or 4,4'-diisocyanatodiphenylmethane, preferably in the presence of a small amount of glycol of 4 to 10 carbon atoms, such as butane-1,4-diol, which acts as a chain extender. Preferred polyester urethanes are those which are obtained from adipic acid, butane-1,4-diol and 4,4'-diisocyanotodiphenylmethane and have a Shore hardness A of from 70 to 100, a strength of from 400 to 420 kp/cm$^2$ and an elongation of about 440–560%. Other polymer binders which have proven satisfactory are those based on a copolymer of from 70 to 95, in particular from 75 to 90, % by weight of vinyl chloride and from 5 to 30, in particular from 10 to 25, % by weight of an alkyl ester of an olefinically unsaturated carboxylic acid of 3 to 5 carbon atoms, such as acrylic acid, methacrylic acid or maleic acid, where the alkyl radical is preferably of 1 to 3 carbon atoms. The corresponding vinyl chloride copolymers with one or more $C_1$-$C_3$-dialkyl maleates, such as copolymers of from 70 to 90% by weight of vinyl cloride, from 5 to 15% by weight of dimethyl maleate and from 5 to 15% by weight of diethyl maleate, are noteworthy. The K value according to H. Fikentscher is from 40 to 60 for the particularly suitable polymer binders.

The magnetic recording media produced using the chromium dioxide prepared according to the invention possess the familiar good electroacoustic properties and, where relevant, video characteristics of conventional chromium dioxide magnetic tapes. Furthermore, they have a particularly high signal-to-noise ratio as well as low print-through properties. The high signal-to-noise ratio results in the tapes having a particularly wide dynamic range at both low and high frequencies, ie. the tapes have an optimum maximum output level. The ratio of noise at rest to signal-to-print-through ratio is also surprisingly good.

The Examples which follow illustrate the invention in comparison with a prior art Comparative Experiment. In the Examples and Comparative Experiment, parts and percentages are by weight, unless stated otherwise. Parts by volume bear the same relation to parts by weight as that of the liter to the kilogram.

EXAMPLE 1

2.19 l of water are initially taken in a reaction vessel having a capacity of 4 l, and 5.68 kg of chromic anhydride ($CrO_3$) are first added while stirring. After 10 minutes, 33 g (0.38% by weight, based on chromium dioxide) of potassium antimonyl tartrate ($KSbO(C_4H_4O_6)$). 0.5 $H_2O$, molecular weight 333.93) and 104 g (1.3% by weight, based on chromium dioxide) of acicular $\gamma$-$Fe_2O_3$ are added. When the evolution of gas which occurs on addition of the antimony-containing modifier has ceased, 2.84 kg of chromium (III) oxide are introduced while stirring constantly, and stirring is continued for a further 20 minutes. The reaction slurry is then heated at from 300° to 350° C. in an autoclave, chromium dioxide being formed during this process. The resulting oxygen causes an increase in pressure, and the pressure is kept at from 300 to 400 bar by means of a regulating valve. When the reaction is complete, the reactor is let down and cooled in such a way that the resulting chromium dioxide has a residual moisture content of from 1 to 5%. It is removed mechanically from the reaction vessel, milled, and suspended in an aqueous sodium sulfite solution, and the agglomerates are broken up by wet-milling. During this procedure, 10% of the chromium dioxide is reduced at the surface of the crystals and converted to chromium (III) oxide hydroxide. The product is filtered, washed and then dried at 50° C. under reduced pressure.

The BET specific surface area in [m$^2$/g] of the resulting chromium dioxide was measured and its magnetic properties were determined by means of a vibrating sample magnetometer in a magnetic field of 160 kA/m at a mean tap density $\rho$[g/cm$^3$], the particular magnetic properties determined being the coercive force $H_c$ in (kA/m), the specific remanence $M_r/\rho$ and the specific magnetization $M_s/\rho$ in (nTm$^3$/g).

The measured values obtained are shown in the Table.

EXAMPLE 2

The procedure described in Example 1 is followed, except that 42 g of potassium antimonyl tartrate are used. The results of the measurements are shown in the Table.

EXAMPLE 3

The procedure described in Example 1 is followed, except that 55 g of potassium antimonyl tartrate are used. The results of the measurements are shown in the Table.

EXAMPLE 4

The procedure described in Example 1 is followed, except that 39 g of antimony tartrate [$Sb_2(C_4H_4O_6)_3 \cdot 6H_2O$, molecular weight 795.81] are used. The results of the measurements are shown in the Table.

EXAMPLE C

The procedure described in Example 1 is followed, except that, instead of potassium antimonyl tartrate, the corresponding amount, based on antimony, of antimony (III) oxide [$Sb_2O_3$, molecular weight 291.5], ie. 14.4 g, is used. The results of the measurements are shown in the Table.

EXAMPLE B1

115 parts of a chromium dioxide prepared as described in Example 1, 2 parts of zinc stearate, 1.5 parts of soya lecithin, 3 parts of a mixture of liquid fatty acids having a melting point of from 50° to 59° C., 110 parts of a mixture of equal amounts of tetrahydrofuran and 1,4-dioxane and 200 parts of 15% strength binder solution prepared by dissolving 19.5 parts of an elastomeric thermoplastic polyurethane (obtained as described in German Published Application DAS No. 1,106,959 from adipic acid, butane-1,4-diol and 4,4'-diphenylisocyanatodiphenylmethane) and 10.5 parts of a vinyl chloride polymer of 80 parts of vinyl chloride and 10 parts of dimethyl maleate in 170 parts of a mixture of equal amounts of tetrahydrofuran and 1,4-dioxane are introduced into a cylindrical steel mill which has a capacity of 1000 parts by volume and contains 1000 parts of steel balls having a diameter of from 4 to 7 mm. The mixture is dispersed for 5 days, and the resulting dispersion is filtered under pressure through a glass fiber/paper filter layer and is applied, on a conventional coating apparatus by means of a knife coater, onto a 12 μm thick polyethylene terephthalate film in a thickness such that the layer obtained after drying and calendering is 5.5 μm thick. Immediately after casting the liquid dispersion, the acicular chromium dioxide particles are oriented along the recording direction by means of a magnetic field. The surface of the magnetic layer has an average peak-to-valley height $R_z$, measured according to DIN 4756, sheet 1, of 0.15 μm. The coated film is slit into 3.81 mm wide magnetic tapes.

The magnetic tapes are tested as follows:
1. Magnetic properties

The magnetic properties of the resulting magnetic tapes are determined using a vibrating sample magnetometer in a magnetic field of 160 kA/m. The coercive force $H_c$ in [kA/m], the residual induction $M_r$ and the maximum magnetization $M_m$ in [mT] are measured, and the orientation ratio Rf is calculated as the quotient of the residual induction along the preferred magnetic direction and that is a crosswise direction.

2. Electroacoustic properties

The electroacoustic tape data are measured according to DIN 45,512, sheet II, against the standard chromium dioxide reference tape S 4592 A, using a HF biassing current of 20 mA. All electroacoustic tape data, maximum output level at long wavelengths $A_T$ and sensitivity $\tau$ at 1 kHz, maximum output level at short wavelengths $A_H$ and sensitivity $E_H$ at 10 kHz, signal-to-bias noise ratio at rest $RG_o$ and signal-to-print-through ratio $K_o$, are based on reference tape S 4592 A, the latter being set to 0 dB for all parameters measured.

The corresponding measured parameters are shown in the Table.

EXAMPLES B2, B3, B4 and BC

The procedure described in Example B1 is followed, except that the corresponding chromium dioxide samples of Examples 2, 3 and 4 and of the Comparative Experiment C are used instead of that of Example 1. The results of the measurements are shown in the Table.

TABLE

| | Examples | | | | |
|---|---|---|---|---|---|
| | 1/B1 | 2/B2 | 3/B3 | 4/B4 | C/BC |
| Powder | | | | | |
| BET | 34.2 | 39.4 | 45.4 | 35 | 25.4 |
| ρ | 1.15 | 1.12 | 1.13 | 1.19 | 1.35 |
| $H_c$ | 51.5 | 51.1 | 47.4 | 50.1 | 49.5 |
| $M_r/\rho$ | 39.3 | 39.1 | 36.8 | 40.3 | 41.7 |
| $M_s/\rho$ | 68.9 | 68.7 | 64.8 | 71.0 | 76.0 |
| Tape | | | | | |
| $H_c$ | 52.9 | 49.6 | 45.2 | 50.7 | 50.9 |
| $M_r$ | 152 | 125 | 112 | 148 | 186 |
| $M_m$ | 171 | 148 | 141 | 170 | 204 |
| $R_f$ | 2.85 | 2.36 | 1.96 | 2.88 | 3.92 |
| d | 5.5 | 6.0 | 6.3 | 5.3 | 5.0 |
| $E_T$ | −2.2 | −2.5 | −3 | −2.0 | −0.5 |
| $E_H$ | +3.5 | +3 | +1.5 | +3.2 | +2.5 |
| $A_T$ | −2.5 | −4 | −1 | −2.1 | +0.5 |
| $A_H$ | +5 | +4.5 | +2 | +4.5 | +4 |
| $RG_o$ | +4.8 | +5.3 | +6.5 | +4.5 | +1.2 |
| $K_o$ | 56.5 | 53.0 | 42.5 | 55.0 | 57.0 |

We claim:

1. A process for the preparation of a ferromagnetic chromium dioxide by converting oxides of trivalent and hexavalent chromium under a pressure of from 100 to 700 bar and at a temperature of from 200° to 600° C. in the presence of water, an antimony modifier and acicular iron oxide particles or acicular iron particles in an amount of not more than 15% by weight comprising adding an antimony compound as a modifier in the form of a water-soluble salt in an amount of at least 0.1% by weight but less than 4% by weight, based on the resulting chromium dioxide and said iron oxide or iron particles to a mixture of hexavalent chromium oxide and water, adding trivalent chromium oxide thereto and subjecting the resultant mixture to said pressure and temperature, with a proviso that the water-soluble antimony compound contains at least one organic molecular moiety anion which is oxidized by the oxide of hexavalent chromium with the evolution of gas when said antimony compound is added to a mixture of said hexavalent chromium oxide and water.

2. The process of claim 1, wherein the antimony compound used as a modifier is antimony tartrate.

3. The process of claim 1, wherein the antimony compound used as a modifier is potassium antimonyl tartrate, and is added in an amount of less than 2% by weight, based on the resulting chromium dioxide.

4. The process of claim 3, wherein the potassium antimonyl tartrate used as a modifier is employed in an amount of from 0.1 to 1% by weight, based on the resulting chromium dioxide.

5. The process of claim 3, wherein acicular iron oxide particles in the form of α- or γ-FeOOH, $Fe_3O_4$ or γ- or $\alpha$-Fe$_2$O$_3$, in an amount of from 0.5 to 15% by weight, based on the chromium dioxide, are used.

6. The process of claim 3, wherein acicular iron particles having a BET specific surface area of from 5 to 40 m$^2$/g are used, in an amount of from 0.4 to 10% by weight, based on the resulting chromium dioxide.

7. The process of claim 1, wherein acicular iron oxide particles in the form of $\alpha$- or $\gamma$-FeOOH, Fe$_3$O$_4$ or $\gamma$- or $\alpha$-Fe$_2$O$_3$, in an amount of from 0.5 to 15% by weight, based on the chromium dioxide, are used.

8. The process of claim 1, wherein acicular iron particles having a BET specific surface area of from 5 to 40 m$^2$/g are used in an amount of from 0.4 to 10% by weight, based on the resulting chromium dioxide.

* * * * *

UNITED STATES PATENT AND TRADEMARK OFFICE
CERTIFICATE OF CORRECTION

PATENT NO. : 4,670,177

DATED     : June 2, 1987

INVENTOR(S) : OHLINGER et al.

It is certified that error appears in the above-identified patent and that said Letters Patent is hereby corrected as shown below:

On the title page Insert
[30] Foreign Application Priority Data

-- April 17, 1985  [DE] Fed. Rep. of Germany  3513723--

Signed and Sealed this

Eighteenth Day of August, 1987

*Attest:*

DONALD J. QUIGG

*Attesting Officer*   Commissioner of Patents and Trademarks